United States Patent [19]

Nelle

[11] Patent Number: 4,479,716
[45] Date of Patent: Oct. 30, 1984

[54] INCREMENTAL MEASURING INSTRUMENT

[75] Inventor: Gunther Nelle, Bergen, Fed. Rep. of Germany

[73] Assignee: Johannes Heidenhain GmbH, Traunreut, Fed. Rep. of Germany

[21] Appl. No.: 308,792

[22] Filed: Oct. 5, 1981

[30] Foreign Application Priority Data

Oct. 7, 1980 [DE] Fed. Rep. of Germany ....... 3037810

[51] Int. Cl.³ ............................................. G01D 5/245
[52] U.S. Cl. .................................. 356/374; 33/125 C; 250/237 G
[58] Field of Search ............................. 356/373, 374; 250/237 G; 23/125 C

[56] References Cited

U.S. PATENT DOCUMENTS 3,867,036 2/1975 Detwiler et al. ............... 250/237 G
4,101,764 7/1978 Nelle .............................. 250/237 G
4,363,964 12/1982 Schmitt ......................... 250/237 G

*Primary Examiner*—R. A. Rosenberger
*Attorney, Agent, or Firm*—Willian Brinks Olds Hofer Gilson & Lione, Ltd.

[57] ABSTRACT

An incremental length or angle measuring instrument includes a scale having a line grid and a plurality of reference marks. A scanning unit is provided with a plurality of photosensors to scan both the line grid and the reference marks. A reference mark selecting arrangement is described which includes a light source and a photosensor. This selecting arrangement acts to select a subset of the reference marks from the total number of reference marks and to bring only this selected subset of reference marks into operation. This selection takes place through the allocation of a light source or a reflecting element to each of the selected reference marks. The scanning unit operates to generate two square wave scanning signals, a reference signal in response to the reference marks and a selection signal in response to the presence or absence of the light source or the reflecting element associated with the selected reference marks. A logic circuit is provided which is responsive to the reference signals and to the selection signals such that a control signal is generated by the logic circuit only if both the reference signal and the selection signal are present simultaneously. The light sources or reflecting elements which serve to designate the selected reference marks can arbitrarily be moved as necessary such that the selected subset of reference marks can be freely and arbitrarily chosen from the total number of reference marks readily and without alteration of the scale itself.

7 Claims, 4 Drawing Figures

INCREMENTAL MEASURING INSTRUMENT

BACKGROUND OF THE INVENTION

This invention relates to an incremental length or angle measuring instrument of the type having a measuring scale which defines a grid, a plurality of reference marks fixedly positioned with respect to this scale, and means for sensing the reference marks and generating a reference signal in response thereto.

In such measuring instruments, electronic signals generated at the reference marks are used in various manners. For example, such electronic signals can be used to set the counter display to zero or to load a predetermined starting value into a counter at a certain position along the scale. Furthermore, such reference marks can be used for correction of the counter and the control of interference pulses.

In one type of known prior art measuring instrument, the number and position of the reference marks are determined in the production of the measuring scale, in accordance with the needs of the user. In such measuring instruments it is not possible during the later use of the measuring instrument to change the number or position of the reference marks, or of the electronic signals derived from the reference marks.

U.S. Pat. No. 4,101,764 discloses a measuring instrument to overcome these disadvantages. As described in this patent, a measuring scale can be provided with a plurality of reference marks that are formed at the time the scale is manufactured and are fixed at predetermined points along the scale. In addition, the disclosed measuring device includes at least one switching means on the scale itself or in its immediate vicinity. This switching means is used to select one or more reference marks such that it is only the selected reference marks which go into effect, and unselected marks have no effect on the operation of the measuring device. This patent discloses a switching means which includes a plurality of magnets, one of which is associated with each reference mark that is to go into effect. A scanning unit is provided to scan the scale, and this scanning unit includes an electrical reed switch which is responsive to the magnets. The electrical output of the reed switch together with the electrical output of the scanning unit are both applied to an electronic component which generates a control pulse at its output only if an electrical signal is simultaneously present on the output of the scanning unit and on the output of the reed switch.

This prior art approach does act to enable only a selected subset of the total number of reference marks. However, experience has shown that electrical switches such as reed switches tend to chatter or bounce during the switching process, and such bounce can lead in turn to interference impulses and thereby to the false generation of control signals in the measuring system. Furthermore, the magnets utilized in this prior art approach to designate the selected reference marks can under unfavorable conditions attract debris such as metal shavings and the like. This debris can also cause disturbances of the measuring process and can adversely effect its accuracy.

SUMMARY OF THE INVENTION

The present invention is directed to an improved incremental measuring device which permits a simple designation of only selected reference marks yet is substantially immune to interference and inaccuracies of the types described above.

According to this invention, an incremental measuring device of the type described above is provided with a set of optical elements. Means are provided for positioning these optical elements to positions associated with respective selected ones of the plurality of reference marks. Means are also provided for optically sensing the brightness of these optical elements and for generating a selection signal in response thereto. The selection signal is then used in conjunction with the reference signals generated in response to the reference marks such that a control signal is generated only in response to the simultaneous occurrence of the reference signal and the selection signal. Thus, the control signal is generated only in response to selected ones of the plurality of reference marks. This control signal can then be used in any of the conventional ways to control the measuring instrument or its display.

Thus, the present invention is directed to an improved measuring device which allows the user to select at will those reference marks which are to go into operation, and which utilizes a photoelectric switching arrangement which avoids the drawbacks of magnets and substantially eliminates the disadvantages of switch bounce. In that the photoelectric switching means of this invention is substantially immune to switch vibration, bounce or chatter during the switching process, the signal processing of the impulses derived from the reference marks can be considerably simplified. Further developments of this invention are defined in the dependent claims.

The invention itself, together with further objects and attendant advantages, will best be understood by reference to the following detailed description taken in conjunction with the accompanying drawings.

DETAILED DESCRIPTION OF THE PRESENTLY PREFERRED EMBODIMENTS

Figure 1:
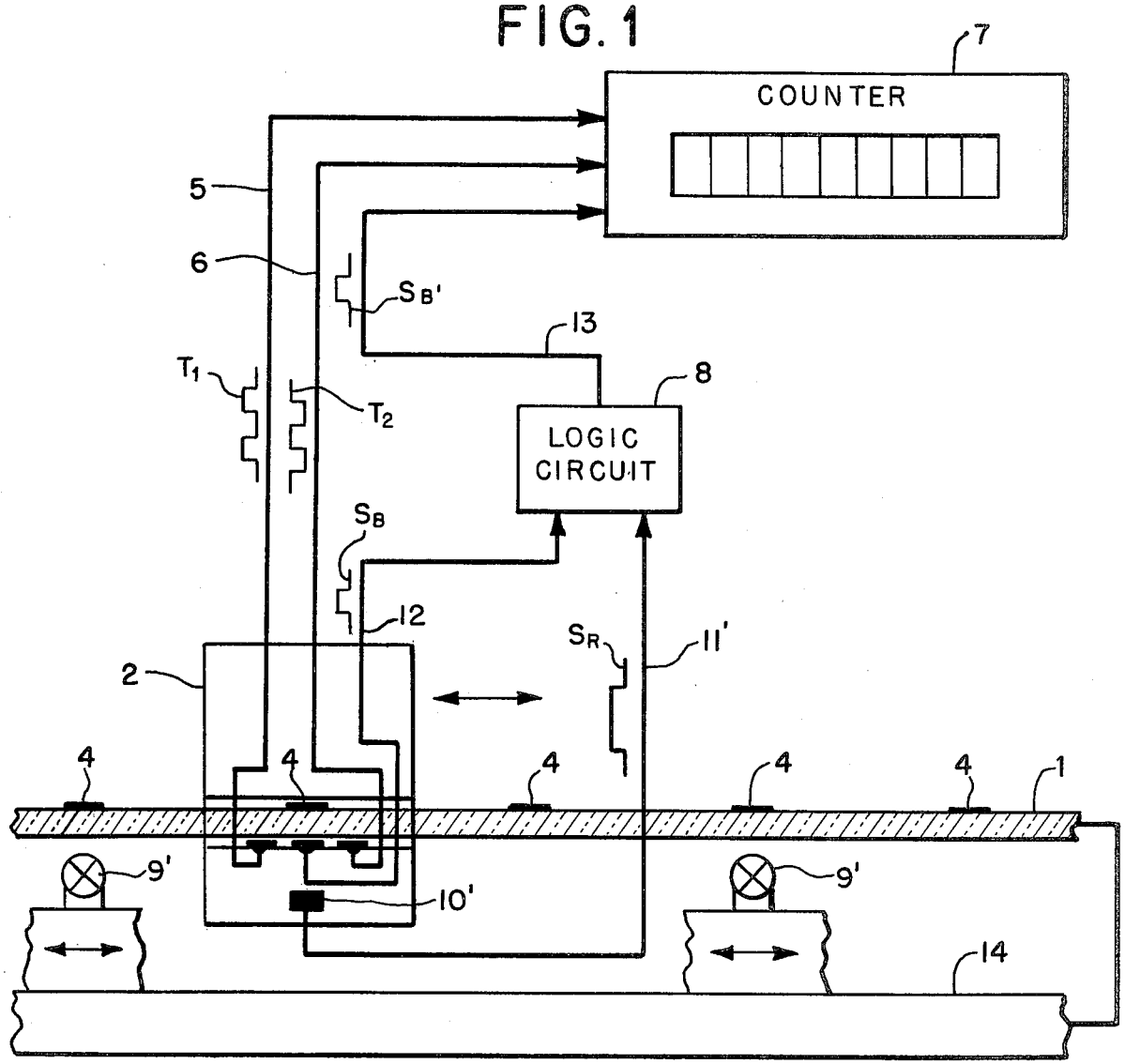
FIG. 1 is a schematic representation of an incremental length measuring device which incorporates a first preferred embodiment of the present invention.
Figure 4:
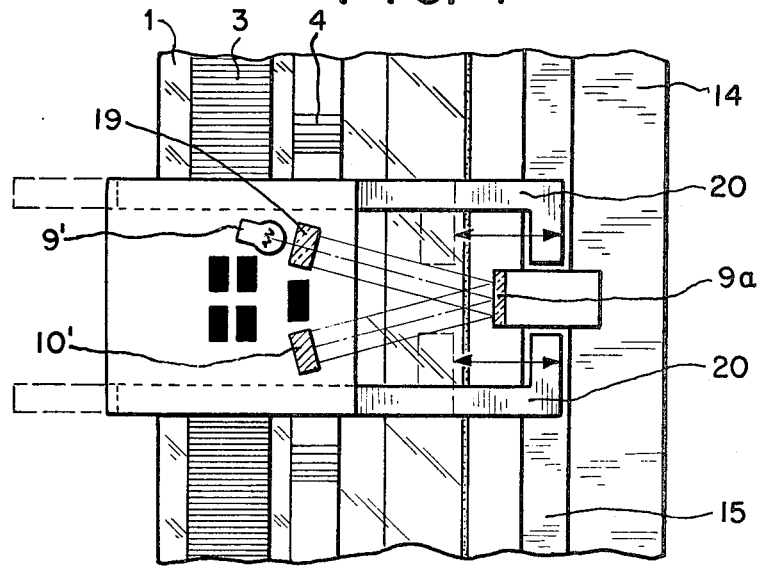
FIG. 4 is a bottom view in partial cut-away of the measuring scale and the scanning unit of a second preferred embodiment of this invention.
Figure 2:
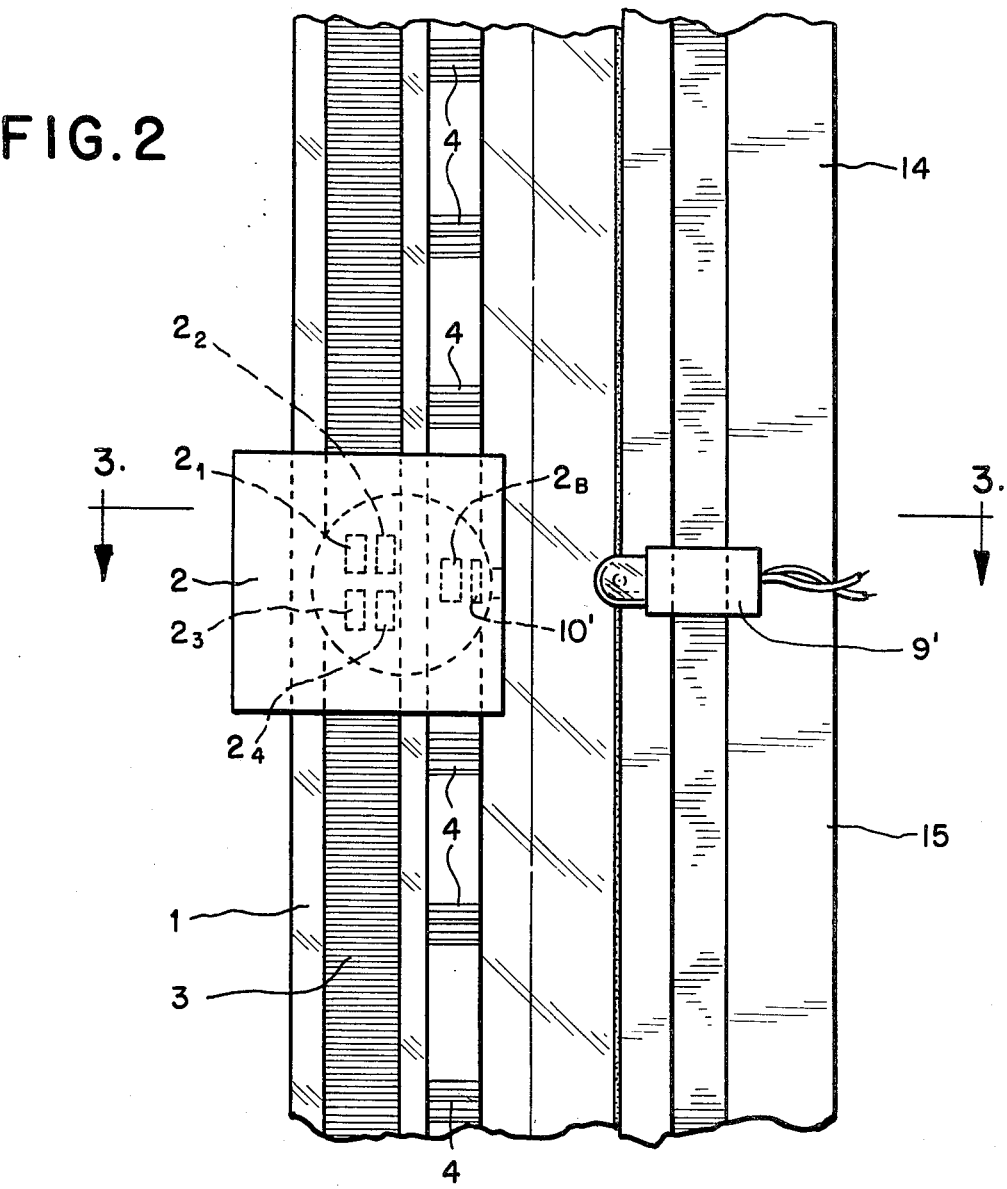
FIG. 2 is a bottom view in partial cut-away of the measuring scale and the scanning unit of the embodiment of FIG. 1.

Turning now to the drawings, FIG. 1 shows a schematic view of a photoelectric, incremental, length measuring instrument which includes a glass measuring scale 1, a scanning unit 2, and an electronic counter 7. The scale 1 defines a regular array of parallel lines which forms a line grid 3, as shown in FIGS. 2 and 4. The line grid 3 of the scale 1 is scanned photoelectrically, without physical contact, in transillumination by the scanning unit 2. The scale 1 also defines a series of reference marks 4 applied along side the line grid 3. Each of the reference marks 4 comprises a set of line groups having a predetermined line distribution.

The scanning unit 2 includes means for generating periodic scanning signals, which signals are amplified in the scanning unit 2 and are converted into square wave signals $T_1, T_2$. The signals $T_1$, $T_2$ are applied via electrical conductors 5 and 6, respectively, to the counter 7. On the basis of a predetermined phase displacement between the scanning signals $T_1$ and $T_2$, the counter 7 detects the direction of movement of the scanning unit 2 with respect to the scale 1 and displays the position of the scanning unit 2 with respect to the scale 1 in digital form.

The scanning unit 2 also includes means for photoelectrically sensing the reference marks 4 to generate a reference signal, which is amplified in the scanning unit 2 and is converted into a square wave reference signal $S_B$. The reference signal $S_B$ can for example serve the purpose of setting the electronic counter 7 to the digital value zero. Measuring devices having the features described in the preceding paragraphs are known to the art, and are described for example in the corporate publications of the firm of Dr. Johannes Heidenhain GmbH, Traunreut, West Germany: *"Fertigungsprogram"* 1973, pages 20–25 and *"Numerische Positionsanzeige"* September, 1977, page 2.

The reference signal $S_B$ derived from the reference marks 4 is applied by means of a conductor 12 to a logic circuit 8. The scanning unit 2 also includes a photosensor 10', the output of which is applied by means of a conductor 11' to the logic circuit 8. A plurality of light sources 9' (which can for example include incandescent lamps or light emitting diodes) are slideable along the direction of the measuring scale 1 such that one of the light sources 9' can be allocated to each of a set of selected reference marks 4.

The scanning unit 2 is positioned to slide along the measuring scale 1 and the grid 3. In the process, when one of the light sources 9' comes alongside and within the field of view of the photosensor 10', the photosensor 10' generates a selection signal $S_R$ which is applied to the logic circuit 8. The logic circuit 8 acts to check for concidence between a reference signal $S_B$ (derived from a reference mark 4) and the selection signal $S_R$ (derived from the light sources 9'). In the event both the reference signal $S_B$ and the selection signal $S_R$ are simultaneously present, the logic circuit 8 generates a control signal $S_B$, which is applied via a conductor 13 to an input terminal of the electronic counter 7. The counter 7 is designed to respond to signals on conductor 13, as for example by setting the digital value displayed by the counter to zero. Obviously, other processes within the measuring instrument can also be controlled with the control signal $S_B$, on conductor 13.

FIG. 2 shows a bottom view of a portion of the measuring device of this embodiment in partial cut-away. As shown in FIG. 2 the scale 1 is mounted on a scale carrier body 14. The scanning unit 2 includes four scanning elements, $2_1$, $2_2$, $2_3$ and $2_4$ for scanning the line grid 3. The associated electrical connections to the counter 7 have been omitted from FIG. 2 in the interest of graphic clarity. A fifth scanning element $2_B$ serves for the scanning of the reference track on which are arranged the reference marks 4. Relative movement between the measuring scale 1 and the scanning unit 2 in the longitudinal direction causes the generation of scanning signals $T_1$ and $T_2$ in the known manner. The reference mark track is scanned by the scanning element $2_B$. The light source 9' is arranged to slide along a line parallel to the measuring scale 1 in a guide or groove 15 defined in the carrier body 14. Thus, the light source 9' moves parallel to and adjacent the reference mark track defined on the scale 1. In this manner, the light source 9' can be brought into alignment with any one of the plurality of reference marks 4. If it is desired to select multiple reference marks 4, multiple light sources 9' can be provided, such that a respective one is allocated to each one of the selected reference marks 4.

Figure 3:
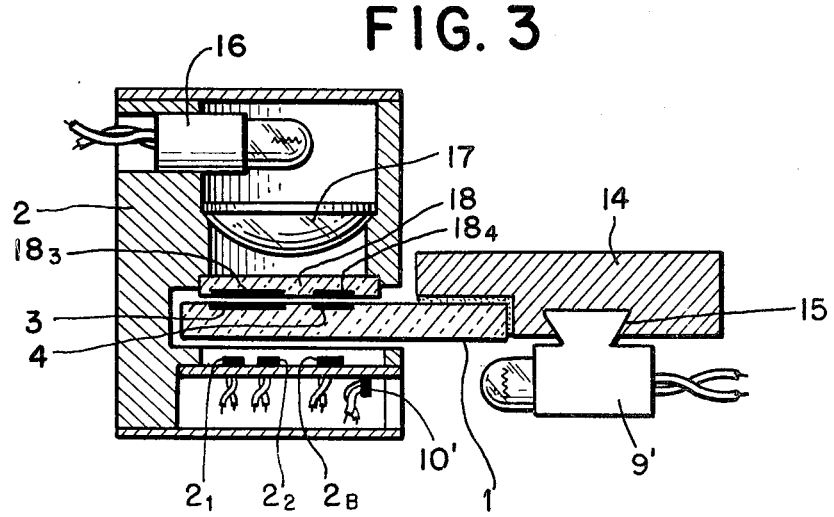
FIG. 3 is a sectional view taken along line 3—3 of FIG. 2.

Thus, the embodiment of FIGS. 1 through 3 operates to select only those reference marks 4 which have a light source 9' positioned adjacent thereto, such that it is only the selected reference marks 4 which go into operation. It should be understood that it lies within the scope of this invention to make a selection of the selected set of reference marks 4 from the total number of reference marks 4 by means that all the reference marks 4 are illuminated by respective light sources 9' except those that are to be selected to go into operation. In this case, the selection signal $S_R$ from the photosensor 10' must be applied with negative potential to the logic circuit 8, if it is assumed that hitherto the signals have been applied with positive potential. Such a modification of the embodiment of FIGS. 1–3 lies within the ability of one of ordinary skill in the art.

FIG. 3 shows a sectional view of the measuring device taken along line 3—3 of FIG. 2. FIG. 3 shows many of the elements already described, and in addition shows the illuminating arrangement for the scanning of the scale 1. This illuminating arrangement includes a miniature lamp 16 which illuminates the scale 1 via a condenser lens 17. A scanning plate 18 is positioned between the scale 1 and the lens 17, and the scanning plate 18 includes countergrids $18_3$ and $18_4$. The operation of such countergrids is well known to the art, and is for example described in *Fertigungsprogram* 1973, pages 22–23 published by the firm of Dr. Johannes Heidenhain GmbH, Traunreut. FIG. 3 shows clearly the manner in which the light source 9' is mounted to slide longitudinally in the dove-tailed groove 15 defined in the scale carrier body 14.

Turning now to FIG. 4, a second preferred embodiment of this invention is in many ways similar to that of FIGS. 1 through 3. In the embodiment of FIG. 4 a reflecting element 9a such as a mirror is mounted to slide along the carrier body 14 in the groove 15, parallel to the scale 1. Thus, the reflecting element 9a can be moved into alignment with any selected one of the reference marks 4. In the embodiment of FIG. 4 the lamp 9' and the photosensor 10' are both positioned on the scanning unit 2 and are oriented in such a way that the illuminating beam from the lamp 9' passes through an illumination optical system 19 onto the reflecting element 9a and is reflected from the reflecting element 9a onto the photosensor 10'. The photo sensor 10' is connected in the manner described above with the logic circuit 8 as shown in FIG. 1.

The embodiment of FIG. 4 also includes two shifting members 20 designed to allow the shifting of the reflecting element 9a along the groove 15 by remote control. These two shifting members 20 are movably positioned on the scanning unit 2 such they are movable between a first position, shown in solid and dotted lines, and a second position, shown in dashed lines in FIG. 4. The shifting members 20 can be positioned either magnetically or pneumatically, for example, such that when the shifting members 20 are in the first position they come into contact with the reflecting element 9a. When the shifting members are extended (as shown in solid lines in FIG. 4), movement of the scanning unit 2 will cause the reflecting element 9a to be pushed along the groove 15 parallel to the scale 1. When the reflecting element 9a has been properly positioned, the shifting members 20 can then be retracted to the position shown in dashed lines in FIG. 4, thereby preventing further movement of the reflecting element 9a by the scanning unit 2. Of course, in alternate embodiments manual methods can be used to position the reflecting element 9a properly.

From the foregoing description it should be apparent that either light sources or reflecting elements can be used in alternate embodiments of this invention. In each case, the photosensor 10' operates to sense the brightness of either the light source 9' or the reflecting element 9a. In this specification and the following claims the term "optical element" will be used in its broad sense to encompass both light sources and reflecting or scattering elements. Furthermore, it should be understood that in the following claims the term "set" is used in its broad sense to encompass various groupings of reference marks having one or more reference marks in the grouping.

Of course, it should be understood that various changes and modifications to the preferred embodiments described above will be apparent to those skilled in the art. It is therefore intended that the foregoing detailed description be regarded merely as illustrative of the presently preferred embodiments of this invention, and not in a limiting manner. It is intended that the following claims, including all equivalents, define the scope of this invention.

I claim:

1. In an incremental measuring device comprising a measuring scale which defines a grid, a plurality of reference marks fixedly positioned with respect to the scale, means for sensing the reference marks and generating a reference signal in response thereto, and means, responsive to a control signal, for controlling the measuring device, the improvement comprising:
   a set of optical elements;
   means for positioning the set of optical elements to postions associated with respective selected ones of the plurality of reference marks;
   means for optically sensing the brightness of the set of optical elements and for generating a selection signal in response thereto;
   means for generating the control signal in response to the reference signal and the selection signal such that the control signal is generated only when the reference signal is present and the selection signal is simultaneously in a predetermined state;
   means for conducting the control signal to the control means;
   a scanning unit mounted for relative movement along the scale;
   said positioning means comprising means, mounted to the scanning unit, for adjusting individual ones of the optical elements such that each of the optical elements is movable along the direction of the scale into alignment with any selected one of the reference marks.

2. The invention of claim 1 wherein each of the optical elements comprises a respective light source; wherein the optically sensing means comprises a photosensor mounted to the scanning unit to sense light emitted by the light sources, said photosensor operating to generate the selection signal; and further, wherein a respective one of the light sources is positioned adjacent each selected reference mark.

3. The invention of claim 1 wherein each of the optical elements comprises a respective reflecting element; wherein the optically sensing means comprises a light source positioned on the scanning unit to illuminate the reflecting elements and a photosensor positioned on the scanning unit to sense light reflected by the reflecting elements from the light source, said photosensor operating to generate the selection signal; and further, wherein a respective one of the reflecting elements is positioned adjacent each selected reference mark.

4. The invention of claim 1 wherein the adjusting means further comprises at least one shifting member positioned on the scanning unit to contact the optical elements to position the optical elements.

5. The invention of claim 1 wherein the positioning means comprises a guide positioned alongside the scale and each of the optical elements is movable along the guide, and wherein the adjusting means comprises at least one shifting member and means for mounting the shifting member to the scanning unit such that the shifting member is movable between a first positon, in which the shifting member does not contact the optical elements, and a second position, in which the shifting member contacts the optical elements to move the optical elements along the guide as to the scanning unit moves along the scale, thereby positioning the optical elements.

6. In an incremental measuring device comprising a measuring scale which defines a grid, a plurality of reference marks fixedly positioned with respect to the scale, means for sensing the reference marks and generating a reference signal in response thereto, and means, responsive to a control signal, for controlling the measuring device, the improvement comprising:
   a guide extending parallel to the measuring scale;
   a set of light sources, each mounted to slide along the guide such that each of the light sources can be positioned in the guide in alignment with a respective selected one of the reference marks;
   a scanning unit mounted for movement along the measuring scale;
   at least one shifting member positioned on the scanning unit to contact the light sources to position the light sources along the guide;
   a photosensor mounted to the scanning unit to sense light emitted by the light sources and to generate a selection signal in response thereto; and
   means for generating the control signal in response to the reference signal and the selection signal such that the control signal is generated only when the reference signal is present and the selection signal is simultaneously in a predetermined state; and
   means for conducting the control signal to the control means.

7. In an incremental measuring device comprising a measuring scale which defines a grid, a plurality of reference marks fixedly positioned with respect to the scale, means for sensing the reference marks and generating a reference signal in response thereto, and means, responsive to a control signal, for controlling the measuring device, the improvement comprising:
   a scanning unit mounted for relative movement along the measuring scale;
   a guide extending parallel to the measuring scale;
   a set of reflecting elements, each mounted to slide along the guide such that each of the light sources can be positioned in the guide in alignment with a respective selected one of the reference marks;
   a light source positioned on the scanning unit to illuminate the reflecting elements;

a photosensor mounted to the scanning unit to sense light reflected from the light source by the reflecting elements, said photosensor operating to generate a selection signal in response thereto;

means for generating the control signal in response to the reference signal and the selection signal such that the control signal is generated only when the reference signal is present and the selection signal is simultaneously in a predetermined state;

means for conducting the control signal to the control means;

at least one shifting member; and means for mounting the shifting member to the scanning unit such that the shifting member is movable between a first position, in which the shifting member does not contact the reflecting elements, and a second position, in which the shifting member contacts the reflecting elements to move the reflecting elements along the guide as the scanning unit moves along the scale, thereby positioning the reflecting elements in the guide.

* * * * *